(12) United States Patent
Park

(10) Patent No.: US 9,611,915 B2
(45) Date of Patent: Apr. 4, 2017

(54) VALVE STRUCTURE OF SHOCK ABSORBER

(71) Applicant: MANDO CORPORATION, Pyeongtaek-si, Gyeonggi-do (KR)

(72) Inventor: Wan Sang Park, Iksan-Si (KR)

(73) Assignee: MANDO CORPORATION, Pyongtaek-si, Gyeonggi-do (KR)

( * ) Notice: Subject to any disclaimer, the term of this patent is extended or adjusted under 35 U.S.C. 154(b) by 57 days.

(21) Appl. No.: 14/588,773

(22) Filed: Jan. 2, 2015

(65) Prior Publication Data

US 2015/0152938 A1 Jun. 4, 2015

Related U.S. Application Data

(63) Continuation-in-part of application No. 13/554,434, filed on Jul. 20, 2012, now Pat. No. 8,967,344.

(30) Foreign Application Priority Data

Jul. 21, 2011 (KR) .................. 10-2011-0072634

(51) Int. Cl.
  *F16F 9/49* (2006.01)
  *F16F 9/512* (2006.01)
  *F16F 9/34* (2006.01)

(52) U.S. Cl.
  CPC .......... *F16F 9/5126* (2013.01); *F16F 9/3405* (2013.01)

(58) Field of Classification Search
  CPC ........................... F16F 9/512; F16F 2228/04
  (Continued)

(56) References Cited

U.S. PATENT DOCUMENTS 3,730,060 A * 5/1973 DeCarbon ............... F16J 1/006
                                                                188/322.22
4,396,098 A * 8/1983 Petrak ..................... F16F 9/512
                                                                188/280

(Continued)

FOREIGN PATENT DOCUMENTS

CN        102808889 A    12/2012
JP        6-174000 A      6/1994
JP        6-078642 A     11/1994

OTHER PUBLICATIONS

Chinese Office Action issued in Chinese Application No. 201210252633.2 dated Mar. 24, 2014.

(Continued)

*Primary Examiner* — Robert A Siconolfi
*Assistant Examiner* — Mahbubur Rashid
(74) *Attorney, Agent, or Firm* — McDermott Will & Emery LLP

(57) ABSTRACT

Provided is a valve structure of a shock absorber which is capable of controlling respective damping forces according to a frequency in compression and rebound motions of a piston valve, thereby satisfying both the ride comfort and the control stability. The valve structure of the shock absorber, which has a cylinder filled with a working fluid and a piston rod having one end located inside the cylinder and the other end extending outward from the cylinder, includes: a main piston valve assembly installed at one end of the piston rod and configured to operate in a state that the inside of the cylinder is divided into an upper chamber and a lower chamber, and generate a damping force varying according to a moving speed; and a frequency unit configured to move together with the main piston valve assembly and generate a damping force varying according to a frequency. The frequency unit includes: a hollow housing mounted at a lower end of the piston rod such that the housing is disposed (Continued)

under the main piston valve assembly; and a free piston disposed to be vertically movable within the housing.

13 Claims, 10 Drawing Sheets

(58) Field of Classification Search
USPC ... 188/280, 281, 282.1, 282.5, 282.6, 282.8, 188/282.9, 283, 275, 322.13, 322.15, 284, 188/286, 316, 317, 312
See application file for complete search history.

(56) References Cited

U.S. PATENT DOCUMENTS

| | | | | |
|---|---|---|---|---|
| 4,407,397 A | * | 10/1983 | Fukushima | F16F 9/344 188/282.8 |
| 4,442,925 A | * | 4/1984 | Fukushima | F16F 9/344 188/282.5 |
| 4,854,429 A | | 8/1989 | Casey | |
| 5,129,488 A | | 7/1992 | Furuya et al. | |
| 5,248,014 A | * | 9/1993 | Ashiba | F16F 9/50 188/282.5 |
| 5,261,448 A | | 11/1993 | Furuya et al. | |
| 5,316,114 A | * | 5/1994 | Furuya | B60G 17/08 137/625.3 |
| 5,368,142 A | | 11/1994 | Ashiba et al. | |
| 5,409,090 A | * | 4/1995 | Kashiwagi | F16F 9/468 188/266.4 |
| 6,561,326 B2 | | 5/2003 | Gotz | |
| 6,918,473 B2 | | 7/2005 | Deferme | |
| 7,255,211 B2 | * | 8/2007 | Gotz | B60G 17/0528 188/280 |
| 9,080,634 B2 | | 7/2015 | Nowaczyk et al. | |
| 2002/0027051 A1 | | 3/2002 | Grundei | |
| 2004/0149530 A1 | | 8/2004 | Drees | |
| 2004/0200946 A1 | | 10/2004 | Pradel et al. | |
| 2005/0045440 A1 | * | 3/2005 | Kock | F16F 9/512 188/322.15 |
| 2006/0283675 A1 | * | 12/2006 | Teraoka | F16F 9/5126 188/298 |
| 2009/0145708 A1 | * | 6/2009 | Kim | F16F 9/5126 188/322.15 |
| 2011/0056783 A1 | * | 3/2011 | Teraoka | F16F 9/5126 188/313 |

OTHER PUBLICATIONS

Japanese Office Action issued in Japanese Application No. 2012-155959 mailed Jul. 2, 2013.
U.S. Office Action dated Apr. 21, 2016 issued in U.S. Appl. No. 14/588,775.
U.S. Notice of Allowance dated Sep. 27, 2016 issued in U.S. Appl. No. 14/588,775.

* cited by examiner

VALVE STRUCTURE OF SHOCK ABSORBER

CROSS-REFERENCE(S) TO RELATED APPLICATION

This application is a continuation-in-part application of U.S. patent application Ser. No. 13/554,434 filed Jul. 20, 2012, which claims priority to and the benefit of Korean Patent Application No. 10-2011-0072634, filed on Jul. 21, 2011, in the Korean Intellectual Property Office, which is hereby incorporated by reference in its entirety.

BACKGROUND OF THE INVENTION

Field of the Invention

The present invention relates to a valve structure of a shock absorber, and more particularly, to a valve structure of a shock absorber which is capable of controlling respective damping forces at a small amplitude and a large amplitude in compression and rebound motions of a piston valve, thereby satisfying both the ride comfort and the control stability.

Description of the Related Art

In general, a suspension is installed in a vehicle to dampen a shock or vibration transferred from a road surface to an axle during driving. As one example of such a suspension, a shock absorber has been used.

A shock absorber operates according to a vibration of a vehicle caused by a state of a road surface. In this case, a damping force generated in the shock absorber varies according to an operating speed of the shock absorber, that is, a fast or slow operating speed thereof.

A vehicle ride comfort and a steering stability may be controlled according to how to adjust a characteristic of a damping force generated in a shock absorber. Therefore, in designing a vehicle, it is very important to adjust a characteristic of a damping force of a shock absorber.

A conventional piston valve is designed to have a constant damping characteristic at a high speed, a middle speed, and a low speed due to the use of a single flow passage. Therefore, when intending to improve a ride comfort by reducing a low-speed damping force, middle-speed and high-speed damping forces may also be affected. In addition, a conventional shock absorber has a configuration in which a damping force varies according to a change in a speed of a piston, regardless of a frequency or a stroke. In the case of the damping force varying according to only the change in the speed of the piston, the same damping force is generated even in various states of the road surface. Therefore, it is difficult to satisfy both the ride comfort and the steering stability.

Accordingly, there is a need for continuously conducting research and development on a valve structure of a shock absorber which can vary a damping force according to various road conditions, such as a frequency and a stroke, thereby satisfying both the vehicle ride comfort and the steering stability.

SUMMARY OF THE INVENTION

An aspect of the present invention is directed to provide a valve structure of a shock absorber, which includes a main piston valve configured to generate a damping force varying according to a moving speed of a piston, and a frequency unit configured to generate a damping force varying according to a frequency, thereby satisfying both the vehicle ride comfort and the control stability.

According to another embodiment of the present invention, a valve structure of a shock absorber, which has a cylinder filled with a working fluid and a piston rod having one end located inside the cylinder and the other end extending outward from the cylinder, includes: a main piston valve assembly installed at one end of the piston rod and configured to operate in a state that the inside of the cylinder is divided into an upper chamber and a lower chamber, and generate a damping force varying according to a moving speed; and a frequency unit configured to move together with the main piston valve assembly and generate a damping force varying according to a frequency, wherein the frequency unit includes: a hollow housing mounted at a lower end of the piston rod such that the housing is disposed under the main piston valve assembly; and a free piston disposed to be vertically movable within the housing.

The frequency unit may include an auxiliary valve assembly mounted at a lower end of the housing.

A flow of a working fluid pressurizing the free piston and a flow of a working fluid passing through the free piston and flowing to an opposite side of the free piston may be formed as a single flow.

An inner space of the housing may be partitioned into an upper space and a lower space by the free piston.

The upper space may communicate with the upper chamber through a connection passage formed inside the piston rod, and the lower space may communicate with the lower chamber through the auxiliary valve assembly amounted at the lower end of the housing.

The free piston may have a through-hole that is opened during a low-frequency compression to allow the working fluid to flow from the lower space to the upper space, and when no external force is applied, the through-hole may maintain a state closed by a valve body.

A lip portion made of a rubber may be integrally formed on an outer circumferential surface of the free piston, and the lip portion may closely contact an inner surface of the housing.

A stepped portion limiting the movement of the free piston may be formed on an inner surface of the upper space of the housing. A plurality of groove portions may be formed on an inner surface of the lower space of the housing. An intermediate portion having an internal diameter substantially equal to an external diameter of the free piston may be formed between the stepped portion and the groove portion.

The frequency unit may include an inner tube installed inside the housing to open or close a flow passage in cooperation with the free piston.

The inner tube may include at least one of a convex portion, a concave portion, a hole, or a cut-out portion, such that a passage communicating the upper chamber with the lower chamber within the cylinder is opened or closed according to a vertical movement of the free piston within the housing.

The inner tube may include at least one upper concave portion, which is concavely formed on an inner surface of the inner tube, and at least one lower concave portion, which is not connected to the upper concave portion and is formed in a straight line with the upper concave portion, and when no external force is applied, the inner tube may be located between the upper concave portion and the lower concave portion.

The inner tube may include a ring-shaped concave portion that is concavely formed on the inner surface in a ring shape, and when no external force is applied, the free piston may be located at a position where the ring-shaped concave portion is formed.

The free piston may be supported by an upper elastic member and a lower elastic member, such that the free piston moves vertically within the inner space of the housing according to a frequency.

DETAILED DESCRIPTION OF EXEMPLARY EMBODIMENTS

Hereinafter, valve structures of shock absorbers according to preferred embodiments of the present invention will be described in detail with reference to the accompanying drawings.

Figure 1:
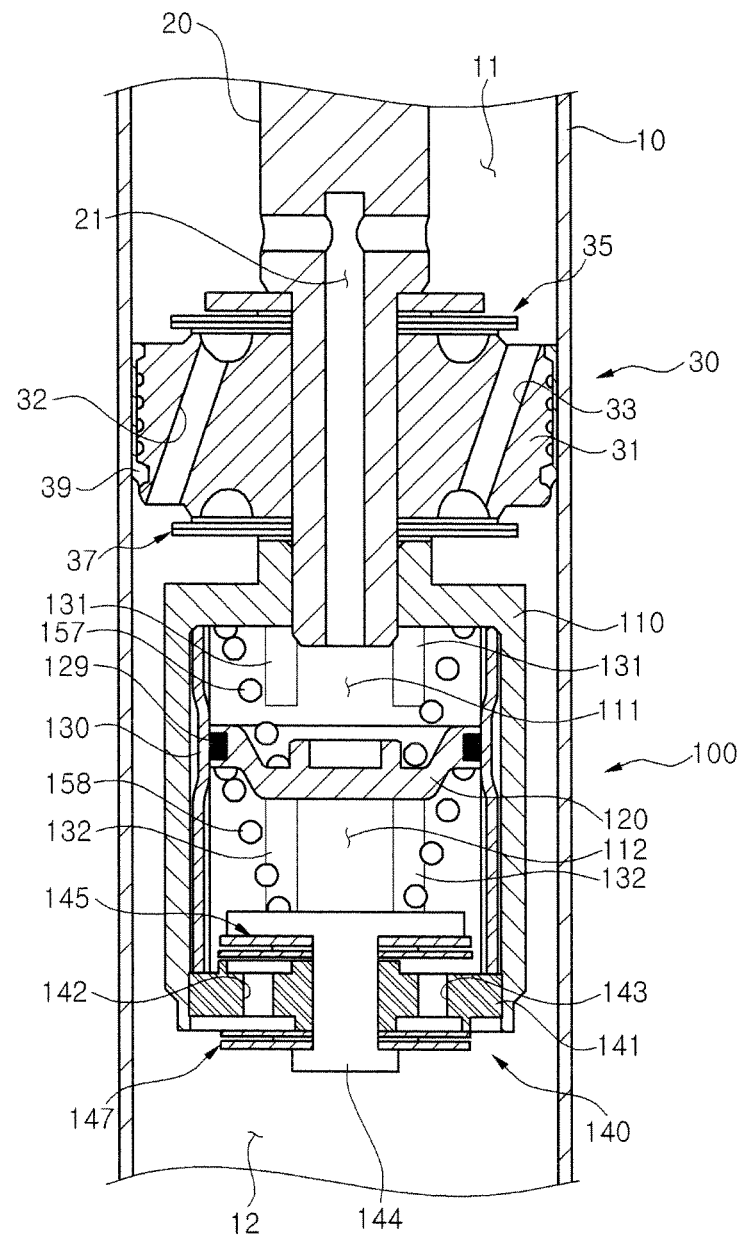
FIG. 1 is a cross-sectional view showing a valve structure of a shock absorber according to the present invention.

As shown in FIG. 1, a shock absorber having a valve structure according to the present invention includes an approximately cylindrical cylinder 10 filled with a working fluid such as oil, and a piston rod 20 having one end located inside the cylinder 10 and the other end extending outward from the cylinder 10.

The valve structure of the shock absorber according to the present invention includes a main piston valve assembly 30 and a frequency unit 100. The main piston valve assembly 30 is installed in one end of the piston rod 20. The main piston valve assembly 30 operates in a state that the inside of the cylinder 10 is divided into an upper chamber 11 and a lower chamber 12, and generates a damping force varying according to a moving speed. The frequency unit 100 moves together with the main piston valve assembly 30, and generates a damping force varying according to a frequency.

The main piston valve assembly 30 and the frequency unit 100 are successively installed at an end of the piston rod 20. The other end of the piston rod 20 is slidable along and liquid-tightly passes through a rod guide and an oil seal, and extends outward from the cylinder 10.

The main piston valve assembly 30 may include a main piston body 31, a main compression valve unit 35, and a main rebound valve unit 37. The main piston body 31 has at least one main compression passage 32, through which a working fluid passes during compression of the shock absorber, and at least one main rebound passage 33, through which a working fluid passes during rebound of the shock absorber. The main compression valve unit 35 is disposed above the main piston body 31 to generate a damping force against a pressure of the working fluid passing through the main compression passage 32. The main rebound valve unit 37 is disposed under the main piston body 31 to generate a damping force against a pressure of the working fluid passing through the main rebound passage 33.

In addition, a Teflon band 39 may be installed on the outer circumferential surface of the main piston body 31 in order for close contact with the inner circumferential surface of the cylinder 10 and prevention of friction.

The frequency unit 100 according to the first embodiment includes a hollow housing 110, a free piston 120, and an auxiliary valve assembly 140. The inside of the housing 110 is empty, and the housing 110 is mounted at a lower end of the piston rod 20 such that it is disposed under the main piston valve assembly 30. The free piston 120 opens or closes a flow passage while moving within the housing 110. The auxiliary valve assembly 140 is mounted at a lower end of the housing 110.

The auxiliary valve assembly 140 includes an auxiliary valve body 141, an auxiliary compression valve unit 145, and an auxiliary rebound valve unit 147. The auxiliary valve body 141 has at least one auxiliary compression passage 142, through which the working fluid passes during compression of the shock absorber, and at least one auxiliary rebound passage 143, through which the working fluid passes during rebound of the shock absorber. The auxiliary compression valve unit 145 is disposed above the auxiliary valve body 141 to generate a damping force against a pressure of the working fluid passing through the auxiliary compression passage 142. The auxiliary rebound valve unit 147 is disposed under the auxiliary valve body 141 to generate a damping force against a pressure of the working fluid passing through the auxiliary rebound passage 143. A fixing member 144, including a rivet, a bolt, and a nut, is installed in the middle of the auxiliary valve body 141, such that the auxiliary compression valve unit 145 and the auxiliary rebound valve unit 147 are disposed above and under the auxiliary valve body 141.

The auxiliary valve body 141 of the auxiliary valve assembly 140 is fixed under the main piston valve assembly 30 by the housing 110. The inner space of the housing 110, in particular, an upper space 111 above the free piston 120, may communicate with the upper chamber 11 through a connection passage 21 formed inside the piston rod 20. The inner space of the housing 110 may be partitioned into the upper space 111 and the lower space 112 by the free piston 120.

The free piston 120 is installed to move vertically within the inner space of the housing 110 according to a frequency (amplitude). The free piston 120 is supported within the inner space of the housing 110 by an upper spring 157 as an upper elastic member and a lower spring 158 as a lower elastic member. The upper elastic member and the lower elastic member may be any one selected from a spring, a disk, and a clip. The upper elastic member and the lower elastic member may be any member that can support the free piston 120 by elasticity. The upper spring 157 and the lower spring 158 as the elastic members may be different in shape or modulus of elasticity, and various modifications may be made in design. In the case in which cone-type coil springs are used as the upper spring 157 and the lower spring 158, it is advantageous to improving a ride comfort and securing an additional free length.

A mount portion may be formed on the top surface of the free piston 120 such that the lower end of the upper spring 157 is mounted thereon. A mount portion may be formed on the bottom surface of the free piston 120 such that the upper end of the lower spring 158 is mounted thereon. The lower end of the lower spring 158 is mounted on the fixing member 144 of the auxiliary valve assembly 140. As in the case of the main piston valve assembly, a Teflon band 129 may be attached to the outer circumferential surface of the free piston 120.

According to the present invention, an inner tube 130, in which a convex portion, a concave portion, a hole, or a cut-out portion is formed, may be inserted into the housing 110 such that the passage communicating the upper chamber 11 with the lower chamber 12 within the cylinder 10 is opened or closed according to the vertical movement of the free piston 120 within the housing 110.

According to the first embodiment of the present invention, the inner tube 130 inserted into the housing 110 includes at least one upper concave portion 131, which is formed concavely on the inner surface of the inner tube 130, and at least one lower concave portion 132, which is not connected to the upper concave portion 131 but is formed in a straight line with the upper concave portion 131. When no external force is applied, the free piston 120 is disposed between the upper concave portion 131 and the lower concave portion 132. That is, when no external force is applied, the free piston 120 is maintained at a height where the concave portion is not formed, and does not allow the flow of the working fluid between the upper chamber 11 and the lower chamber 12. To this end, an internal diameter of the inner tube 130 in a region where the concave portion is not formed is substantially equal to an external diameter of the free piston 120.

According to the first embodiment of the present invention, when the passage between the upper space 111 and the lower space 112 is opened, the working fluid pressurizing the free piston 120 flows through this passage. In other words, according to the first embodiment of the present invention, since the working fluid pressurizing the free piston 120 flows through the passage to an opposite side of the free piston 120, the flow of the working fluid pressurizing the free piston 120 and the flow of the working fluid passing through the free piston and flowing to the opposite side are formed as a single flow, not separate flows.

Hereinafter, the operation of the valve structure according to the first embodiment of the present invention will be described with reference to FIGS. 2 and 3.

Figure 2:
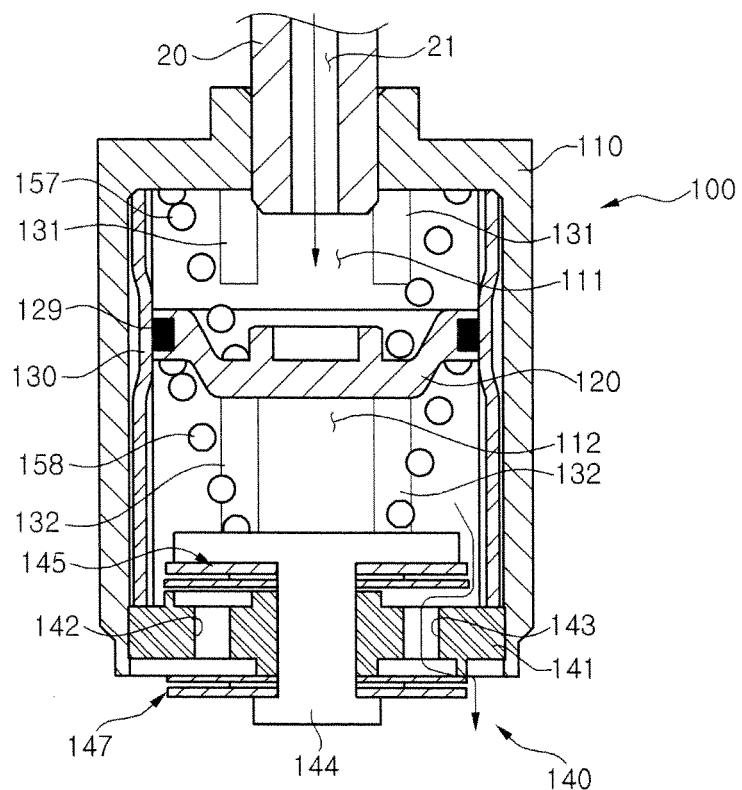
FIG. 2 is a cross-sectional view showing main parts for describing a fluid flow through a valve structure of a shock absorber at a high frequency according to a first embodiment of the present invention.
Figure 3:
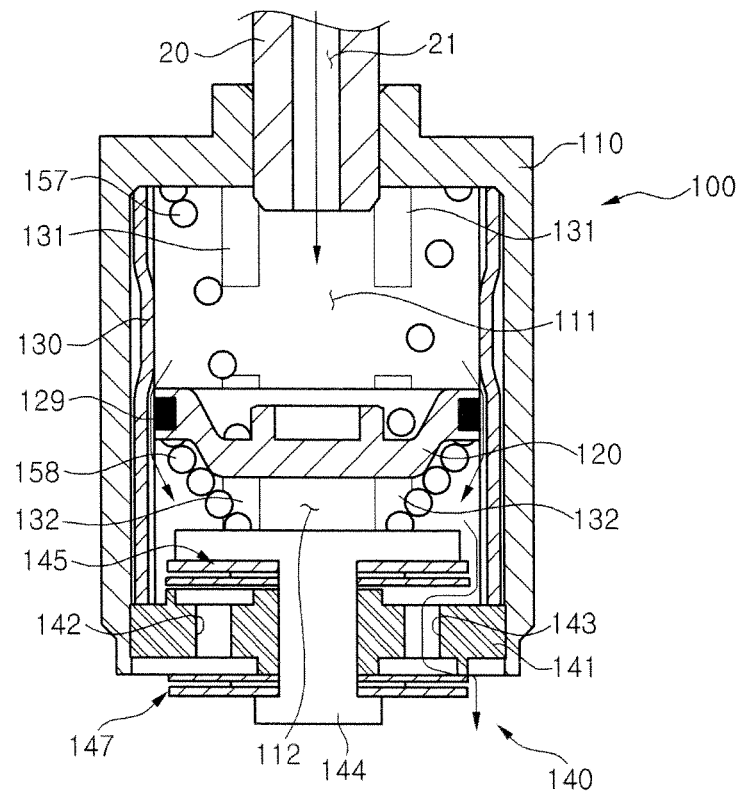
FIG. 3 is a cross-sectional view showing main parts for describing a fluid flow through a valve structure of a shock absorber at a low frequency according to a first embodiment of the present invention.

FIG. 2 shows a position of the free piston 120 at a high frequency (that is, a small amplitude), and FIG. 3 shows a position of the free piston 120 at a low frequency (that is, a large amplitude). When the external force, such as the inertia and the pressure of the working fluid, is applied, the free piston 120 may move while compressing the upper spring 157 or the lower spring 158. That is, when the external force applied to the free piston 120 is strong enough to compress the upper spring 157 or the lower spring 158, the free piston 120 moves upward or downward.

FIG. 2 shows a state in which the external force applied to the free piston 120 is not strong enough to compress the upper spring 157 or the lower spring 158 because the movement amplitude of the piston rod of the shock absorber is small and the frequency thereof is high. In a state that the free piston 120 does not move, the outer surface of the free piston 120 is in contact with the inner surface of the inner tube 130 all over the entire periphery. Therefore, the flow of the working fluid is impossible. In this case, the working fluid of the upper chamber 11 may flow to the connection passage 21 formed inside the piston rod 20 and the upper space 11, that is, the space above the free piston 120 among the inner spaces of the housing 110, but a more flow is impossible by the free piston 120.

As such, at the high frequency and the small amplitude, the working fluid can mainly flow through the main piston valve assembly 30. Therefore, the damping force is mainly obtained by the main piston valve assembly 40.

FIG. 3 shows a state in which the external force applied to the free piston 120 is strong enough to compress the upper spring 157 or the lower spring 158 because the movement amplitude of the piston rod of the shock absorber is large and the frequency thereof is low. In this case, the working fluid of the upper chamber 11 may flow to the lower chamber 12 through the connection passage 21 formed inside the piston rod 20, the lower concave portion 132 formed on the inner surface of the inner tube 130, and the auxiliary valve assembly 140. The working fluid may also flow from the lower chamber 12 to the upper chamber 11. That is, the working fluid of the lower chamber 12 may flow to the upper chamber 11 through the auxiliary valve assembly 140, the lower concave portion 132 formed on the inner surface of the inner tube 130, and the connection passage 21 formed inside the piston rod 20.

Although only the state of the rebound stroke is shown in FIG. 3, the free piston 120 moves upward and the working fluid can flow through the upper concave portion 131, even when the external force applied to the free piston 120 is strong enough to compress the upper spring 157 because the movement amplitude of the piston rod of the shock absorber is large and the frequency thereof is low during the compression stroke.

As such, at the low frequency and the large amplitude, the damping force can be obtained by the main piston valve assembly 30 and the auxiliary valve assembly 140.

Hereinafter, a valve structure according to a second embodiment of the present invention will be described with reference to FIGS. 4 and 5. Since the valve structure according to the second embodiment is different in the frequency unit from the valve structure according to the first embodiment, a description will focus on the difference therebetween.

The frequency unit 200 according to the second embodiment includes a hollow housing 210, a free piston 220, and an auxiliary valve assembly 240. The inside of the housing 210 is empty, and the housing 210 is mounted at a lower end of the piston rod 20 such that it is disposed under the main piston valve assembly 30. The free piston 220 opens or closes a flow passage while moving within the housing 210. The auxiliary valve assembly 240 is mounted at a lower end of the housing 210.

The auxiliary valve assembly 240 includes an auxiliary valve body 241, an auxiliary compression valve unit 245, and an auxiliary rebound valve unit 247. The auxiliary valve body 241 has at least one auxiliary compression passage 242, through which a working fluid passes during compression of the shock absorber, and at least one auxiliary rebound passage 243, through which a working fluid passes during rebound of the shock absorber. The auxiliary compression valve unit 245 is disposed above the auxiliary valve body 241 to generate a damping force against a pressure of the working fluid passing through the auxiliary compression passage 242. The auxiliary rebound valve unit 247 is disposed under the auxiliary valve body 241 to generate a damping force against a pressure of the working fluid passing through the auxiliary rebound passage 243. A fixing member 244, including a rivet, a bolt, and a nut, is installed in the middle of the auxiliary valve body 241, such that the auxiliary compression valve unit 245 and the auxiliary rebound valve unit 27147 are disposed above and under the auxiliary valve body 241.

The auxiliary valve body 241 of the auxiliary valve assembly 240 is fixed under the main piston valve assembly 30 by the housing 210. The inner space of the housing 210, in particular, an upper space 211 above the free piston 220, may communicate with the upper chamber 11 through a connection passage 21 formed inside the piston rod 20. The inner space of the housing 210 may be partitioned into the upper space 211 and the lower space 212 by the free piston 220.

The free piston 220 is installed to move vertically within the inner space of the housing 210 according to a frequency (amplitude). The free piston 220 is supported within the inner space of the housing 210 by an upper spring 257 as an upper elastic member and a lower spring 258 as a lower elastic member. The upper elastic member and the lower elastic member may be any one selected from a spring, a disk, and a clip. The upper elastic member and the lower elastic member may be any member that can support the free piston 220 by elasticity. The upper spring 257 and the lower spring 258 as the elastic members may be different in shape or modulus of elasticity, and various modifications may be made in design. In the case in which cone-type coil springs are used as the upper spring 257 and the lower spring 258, it is advantageous to improving a ride comfort and securing an additional free length.

A mount portion may be formed on the top surface of the free piston 220 such that the lower end of the upper spring 257 is mounted thereon. A mount portion may be formed on the bottom surface of the free piston 220 such that the upper end of the lower spring 258 is mounted thereon. The lower end of the lower spring 258 is mounted on the fixing member 244 of the auxiliary valve assembly 240. As in the case of the main piston valve assembly 40, a Teflon band 229 may be attached to the outer circumferential surface of the free piston 220.

According to the present invention, an inner tube 230, in which a convex portion, a concave portion, a hole, or a cut-out portion is formed, may be inserted into the housing 210 such that the passage communicating the upper chamber 11 with the lower chamber 12 within the cylinder 10 is opened or closed according to the vertical movement of the free piston 220 within the housing 210.

According to the second embodiment, the inner tube 230 inserted into the housing 210 has a ring-shaped concave portion 231 that is concavely formed in a ring shape on the inner surface thereof. When no external force is applied, the free piston 220 is disposed at a position where the ring-shaped concave portion 231 is formed. That is, when no external force is applied, the free piston 220 is maintained at a height where the concave portion is formed, and allows the flow of the working fluid between the upper chamber 11 and the lower chamber 12. On the other hand, when the external force is applied to move the free piston 220 vertically by more than a predetermined distance and thus the free piston 220 gets out of the region where the ring-shaped concave portion 231 is formed, the flow passage of the working fluid between the upper chamber 11 and the lower chamber 12 is closed by the free piston 220. To this end, an internal diameter of the inner tube 230 in a region where the concave portion is not formed is substantially equal to an external diameter of the free piston 220.

Hereinafter, the operation of the valve structure according to the second embodiment of the present invention will be described with reference to FIGS. 4 and 5.

Figure 4:
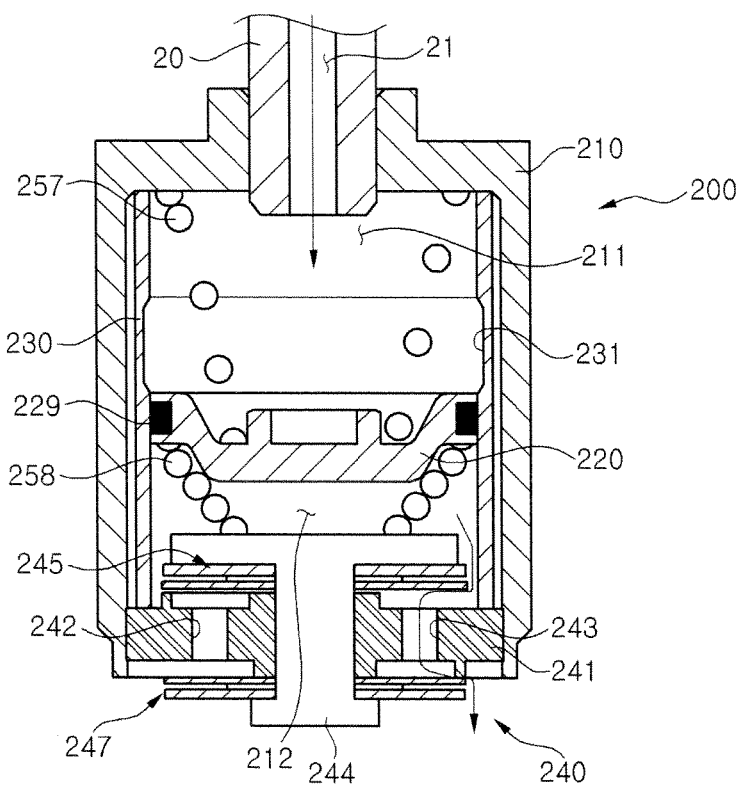
FIG. 4 is a cross-sectional view showing main parts for describing a fluid flow through a valve structure of a shock absorber at a low frequency according to a second embodiment of the present invention.
Figure 5:
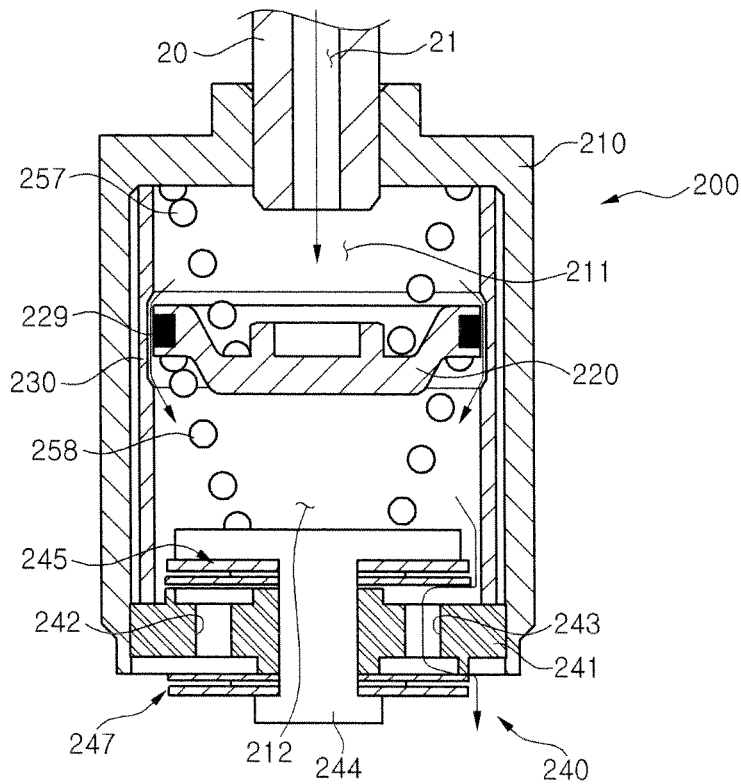
FIG. 5 is a cross-sectional view showing main parts for describing a fluid flow through a valve structure of a shock absorber at a high frequency according to a second embodiment of the present invention.

FIG. 4 shows a position of the free piston 220 at a low frequency (that is, a large amplitude), and FIG. 5 shows a position of the free piston 220 at a high frequency (that is, a small amplitude). When the external force, such as the inertia and the pressure of the working fluid, is applied, the free piston 220 may move while compressing the upper spring 257 or the lower spring 258. That is, when the external force applied to the free piston 220 is strong enough to compress the upper spring 257 or the lower spring 258, the free piston 220 moves upward or downward.

FIG. 4 shows a state in which the external force applied to the free piston 220 is strong enough to compress the upper spring 257 or the lower spring 258 because the movement amplitude of the piston rod of the shock absorber is large and the frequency thereof is low. In a state that the free piston 220 moves, the outer surface of the free piston 220 is in contact with the inner surface of the inner tube 230 all over the entire periphery. Therefore, the flow of the working fluid is impossible. In this case, the working fluid of the upper chamber 11 may flow to the connection passage 21 formed inside the piston rod 20 and the upper space 211, that is, the space above the free piston 220 among the inner spaces of the housing 210, but a more flow is impossible by the free piston 220.

Although only the state of the rebound stroke is shown in FIG. 4, the free piston 220 moves upward and the flow of the working fluid is impossible, even when the external force applied to the free piston 220 is strong enough to compress the upper spring 257 because the movement amplitude of the piston rod of the shock absorber is large and the frequency thereof is low during the compression stroke.

As such, at the low frequency and the large amplitude, the working fluid can mainly flow through the main piston valve assembly 30. Therefore, the damping force is mainly obtained by the main piston valve assembly 40.

FIG. 5 shows a state in which the external force applied to the free piston 220 is not strong enough to compress the upper spring 257 or the lower spring 258 because the movement amplitude of the piston rod of the shock absorber is small and the frequency thereof is high. In this case, the working fluid of the upper chamber 11 may flow to the lower chamber 12 through the connection passage 21 formed inside the piston rod 20, the ring-shaped concave portion 232 formed on the inner surface of the inner tube 230, and the auxiliary valve assembly 240. The working fluid may also flow from the lower chamber 12 to the upper chamber 11. That is, the working fluid of the lower chamber 12 may flow to the upper chamber 11 through the auxiliary valve assembly 240, the ring-shaped concave portion 232 formed on the inner surface of the inner tube 230, and the connection passage 21 formed inside the piston rod 20. As such, at the high frequency and the small amplitude, the damping force can be obtained by the main piston valve assembly 30 and the auxiliary valve assembly 240.

Figure 6A:
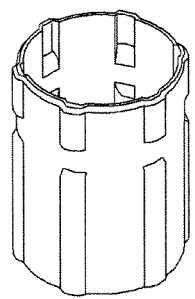
FIGS. 6A to 6D are perspective views of inner tubes having various shapes according to the present invention.
Figure 6B:
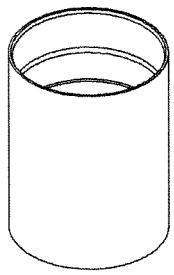
Figure 6C:
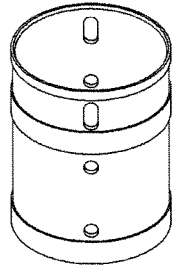
Figure 6D:
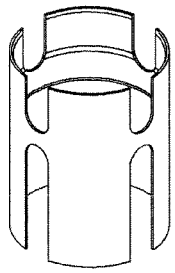

Inner tubes having various shapes are shown in FIGS. 6A to 6D. FIG. 6A is a perspective view of the inner tube 130 applied to the first embodiment of the present invention. In the example of FIG. 6A, upper and lower concave portions are formed by pressurizing a cylindrical tube by a press or the like. An example in which an inner surface is processed in a circumferential direction is shown in FIG. 6B. If necessary, a plurality of holes may be formed in the cylindrical tube as shown in FIG. 6C, or the inner tube may be manufactured by forming cut-out portions in upper and lower sides as shown in FIG. 6D.

Hereinafter, a valve structure according to a third embodiment of the present invention will be described with reference to FIGS. 7 and 9. Since the valve structure according to the third embodiment is different in the frequency unit from the valve structure according to the first embodiment, a description will focus on the difference therebetween.

The frequency unit 300 according to the third embodiment includes a hollow housing 310, a free piston 320, and an auxiliary valve assembly 340. The inside of the housing 310 is empty, and the housing 310 is mounted at a lower end of the piston rod 20 such that it is disposed under the main piston valve assembly 30a. The free piston 320 opens or closes a flow passage while moving within the housing 310. The auxiliary valve assembly 340 is mounted at a lower end of the housing 310.

Figure 7:
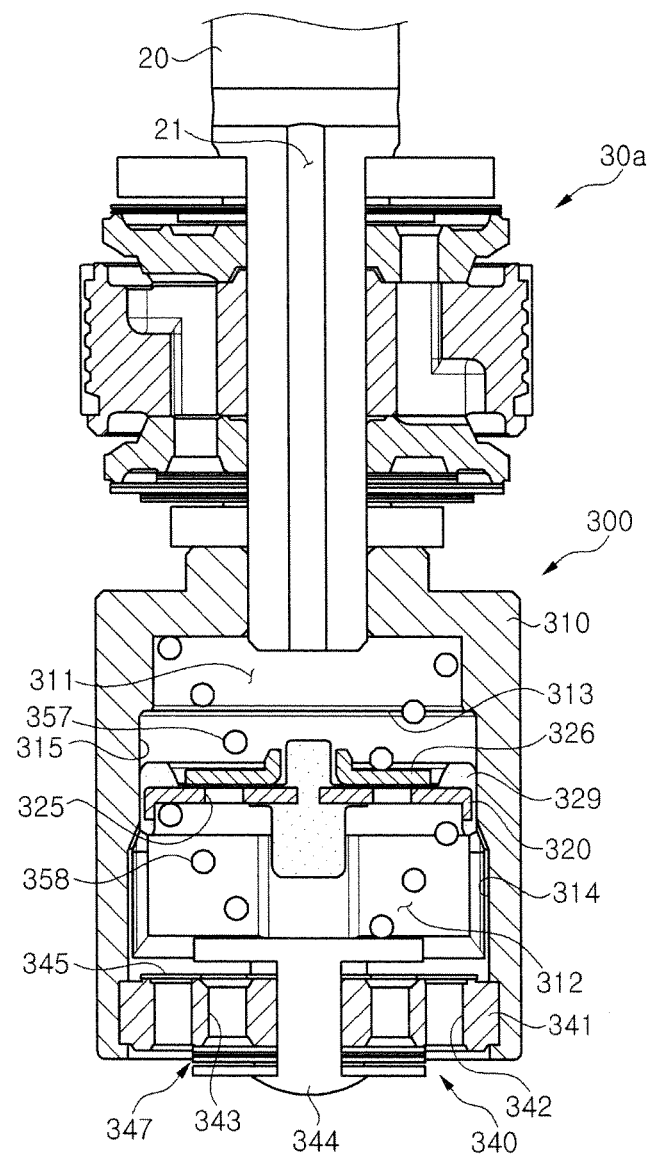
FIG. 7 is a cross-sectional view showing a valve structure of a shock absorber according to a third embodiment of the present invention.

Although the main piston valve assembly 30a of FIG. 7 is shown as having a different configuration from the main piston valve assembly 30 of FIG. 1, the configurations of the main piston valve assemblies 30 and 30a are merely exemplary and the present invention is not limited by the configurations of the main piston valve assemblies.

The auxiliary valve assembly 340 includes an auxiliary valve body 341, an auxiliary compression valve unit 345, and an auxiliary rebound valve unit 347. The auxiliary valve body 341 has at least one auxiliary compression passage 342, through which a working fluid passes during compression of the shock absorber, and at least one auxiliary rebound passage 343, through which a working fluid passes during rebound of the shock absorber. The auxiliary compression valve unit 345 is disposed above the auxiliary valve body 341 to generate a damping force against a pressure of the working fluid passing through the auxiliary compression passage 342. The auxiliary rebound valve unit 347 is disposed under the auxiliary valve body 341 to generate a damping force against a pressure of the working fluid passing through the auxiliary rebound passage 343. A fixing member 344, including a rivet, a bolt, and a nut, is installed in the middle of the auxiliary valve body 341, such that the auxiliary compression valve unit 345 and the auxiliary rebound valve unit 347 are disposed above and under the auxiliary valve body 341.

Although the auxiliary valve assembly 340 of FIG. 7 is shown as having a different configuration from the auxiliary valve assembly 140 of FIG. 1, the configurations of the auxiliary valve assemblies 140 and 340 are merely exemplary.

The auxiliary valve body 341 of the auxiliary valve assembly 340 is fixed under the main piston valve assembly 30a by the housing 310. The inner space of the housing 310, in particular, an upper space 311 above the free piston 320, may communicate with the upper chamber 11 through a connection passage 21 formed inside the piston rod 20. A lower space 312 under the free piston 320 may communicate with the lower chamber 12 through the auxiliary valve assembly 340. The inner space of the housing 310 may be partitioned into the upper space 311 and the lower space 312 by the free piston 320.

The free piston 320 is installed to move vertically within the inner space of the housing 310 according to a frequency (amplitude). The free piston 320 is supported within the inner space of the housing 310 by an upper spring 357 as an upper elastic member and a lower spring 358 as a lower elastic member. The upper elastic member and the lower elastic member may be any one selected from a spring, a disk, and a clip. The upper elastic member and the lower elastic member may be any member that can support the free piston 320 by elasticity. The upper spring 357 and the lower spring 358 as the elastic members may be different in shape or modulus of elasticity, and various modifications may be made in design. In the case in which cone-type coil springs are used as the upper spring 357 and the lower spring 358, it is advantageous to improving a ride comfort and securing an additional free length.

The free piston 320 has a through-hole 325 that is opened during a low-frequency compression to allow the working fluid to flow from the lower space 312 to the upper space 311. If no external force is applied, the through-hole 325 maintains a state closed by a valve body 326. The valve body 326 is stacked on the upper surface of the free piston 320. The lower end of the upper spring 357 is mounted on the valve body 326. Accordingly, the valve body 326 is pressurized toward the free piston 320. A mount portion may be formed on the bottom surface of the free piston 320 such that the upper end of the lower spring 358 is mounted thereon. The lower end of the lower spring 358 is mounted on the fixing member 344 of the auxiliary valve assembly 340.

As in the case of the first and second embodiments, a Teflon band may be attached to the outer circumferential surface of the free piston 320. On the other hand, in the third embodiment, a lip portion 329 made of a rubber may be integrally formed. The lip portion 329 may closely contact the inner surface of the housing 310 and perform a sealing function.

According to the third embodiment, instead of inserting the separate inner tube into the housing 310, a stepped portion 313 and a plurality of groove portions 314 may be directly formed on the inner surface of the housing 310 when needed. Accordingly, as the free piston 320 moves vertically within the housing 310, the passage communicating the upper chamber 11 with the lower chamber 12 within the cylinder 10 may be opened or closed.

According to the third embodiment, the stepped portion 313 limiting the movement of the free piston 320 is formed on the inner surface of the upper space 311 of the housing 310. The plurality of groove portions 314 are formed on the inner surface of the lower space 312 of the housing 310. An intermediate portion 315 is formed between the stepped portion 313 and the groove portion 314 on the inner surface of the housing 310. The intermediate portion 315 has an internal diameter substantially equal to an external diameter of the free piston 320, more specifically, an external diameter of the lip portion 329 integrally formed at a circumferential edge of the free piston 320. When no external force is applied, the free piston 320 is disposed at the intermediate portion 315 of the housing 310.

When no external force is applied, the free piston 320 is disposed at the intermediate portion 315. Accordingly, the free piston 320 does not allow the flow of the working fluid between the upper chamber 11 and the lower chamber 12. On the other hand, when the external force is applied to move the free piston 320 downward by more than a predetermined distance and thus the free piston 315 gets out of the intermediate portion 315, the working fluid may flow through the groove portions 314. In addition, when the external force is applied to move upward the valve body 326 stacked on the upper surface of the free piston 320 while compressing the upper spring 357, the through-hole 325 is opened to allow the flow of the working fluid.

According to the third embodiment of the present invention, when the passage between the upper space 311 and the lower space 312 is opened, the working fluid pressurizing the free piston 320 flows through this passage.

In other words, according to the third embodiment of the present invention, since the working fluid pressurizing the free piston 320 flows through the passage to an opposite side of the free piston 320, the flow of the working fluid pressurizing the free piston 320 and the flow of the working fluid passing through the free piston 320 and flowing to the opposite side of the free piston 320 are formed as a single flow, not separate flows.

Hereinafter, the operation of the valve structure according to the third embodiment of the present invention will be described with reference to FIGS. 7 and 9.

Figure 8:
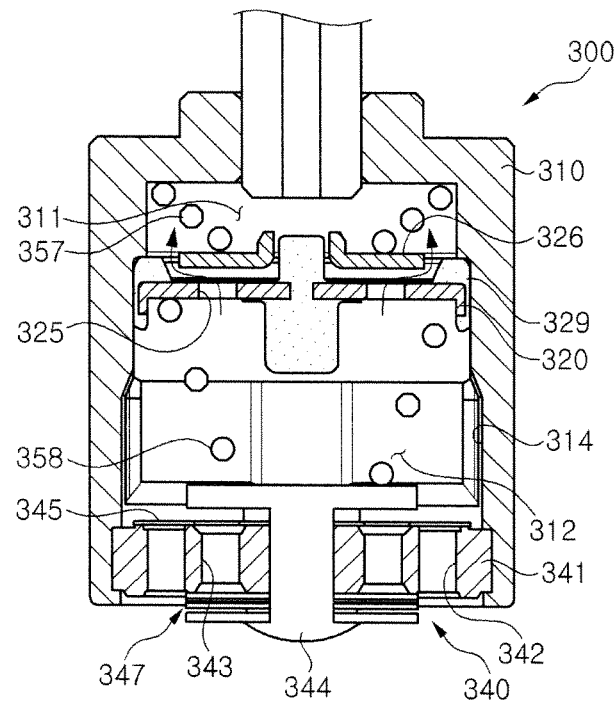
FIG. 8 is a cross-sectional view showing main parts for describing a fluid flow through a valve structure of a shock absorber in a low-frequency compression mode according to a third embodiment of the present invention.

FIG. 7 shows a position of the free piston 320 in an initial state in which no external force is applied. FIG. 8 shows a position of the free piston 320 during a low-frequency (that is, large-amplitude) compression, and FIG. 9 shows a position of the free piston 320 during a low-frequency (that is, large-amplitude) rebound. When the external force, such as the inertia and the pressure of the working fluid, is applied, the free piston 320 may move while compressing the upper spring 357 or the lower spring 358. That is, when the external force applied to the free piston 320 is strong enough to compress the upper spring 357 or the lower spring 358, the free piston 320 moves upward or downward.

FIG. 7 shows a state in which the external force applied to the free piston 320 is not strong enough to compress the upper spring 357 or the lower spring 358 because the movement amplitude of the piston rod of the shock absorber is small and the frequency thereof is high. In a state that the free piston 320 is located at the intermediate portion 315, the outer surface of the free piston 320 is in contact with the intermediate portion 315 of the inner surface of the housing. Therefore, the flow of the working fluid between the upper space 311 and the lower space 312 is impossible.

FIG. 8 shows a state in which the external force applied to the free piston 320 is strong enough to compress the upper spring 357 because the downward-movement amplitude of the piston rod of the shock absorber is large and the frequency thereof is low. When the free piston 320 moving while compressing the upper spring 257 comes into contact with the stepped portion 313, further movement of the free piston 320 is limited. In this case, when the external force is continuously applied, the valve body 326 closing the through-hole 325 moves while further compressing the upper spring 357. Accordingly, the through-hole 325 is opened, and the working fluid may flow from the lower space 312 to the upper space 311.

Figure 9:
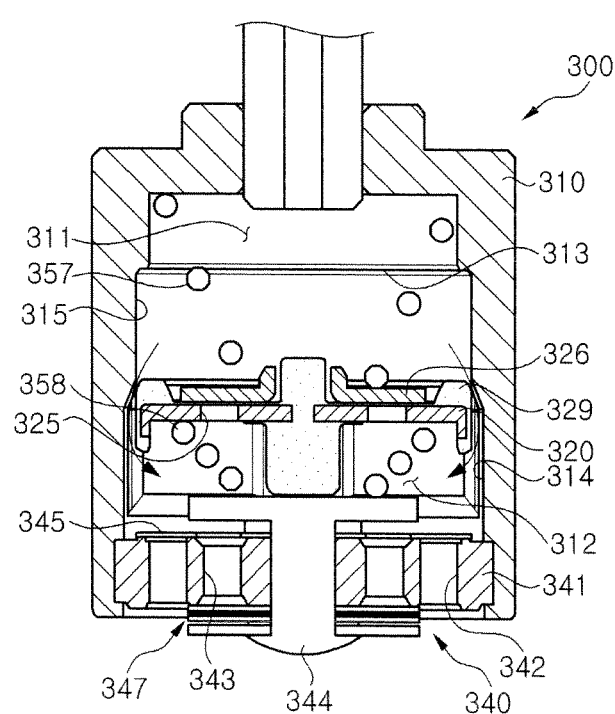
FIG. 9 is a cross-sectional view showing main parts for describing a fluid flow through a valve structure of a shock absorber in a low-frequency rebound mode according to a third embodiment of the present invention.

FIG. 9 shows a state in which the external force applied to the free piston 320 is strong enough to compress the upper spring 358 because the upward-movement amplitude of the piston rod of the shock absorber is large and the frequency thereof is low. When the free piston 320 moving while compressing the lower spring 358 moves up to a region where the groove portion 314 is formed, the passage allowing the flow of the working fluid is opened and thus the working fluid can flow to the lower space 312. As described above, the present invention can provide a valve structure of a shock absorber, which includes a main piston valve configured to generate a damping force varying according to a moving speed of a piston, and a frequency unit configured to generate a damping force varying according to a frequency.

Hereinafter, a valve structure according to a fourth embodiment of the present invention will be described with reference to FIGS. 10 to 13B. The valve structure according to the fourth embodiment is substantially similar to the valve structure according to the third embodiment, except for a frequency unit.

A frequency unit 400 according to the fourth embodiment of the present invention includes a hollow housing 410 mounted at a lower end of a piston rod 20 such that the housing 410 is disposed under a main piston valve assembly 30a, a free piston 420 configured to open or close a flow passage while moving within the housing 410, and an auxiliary valve assembly 440 mounted at a lower end of the housing 410.

Figure 10:
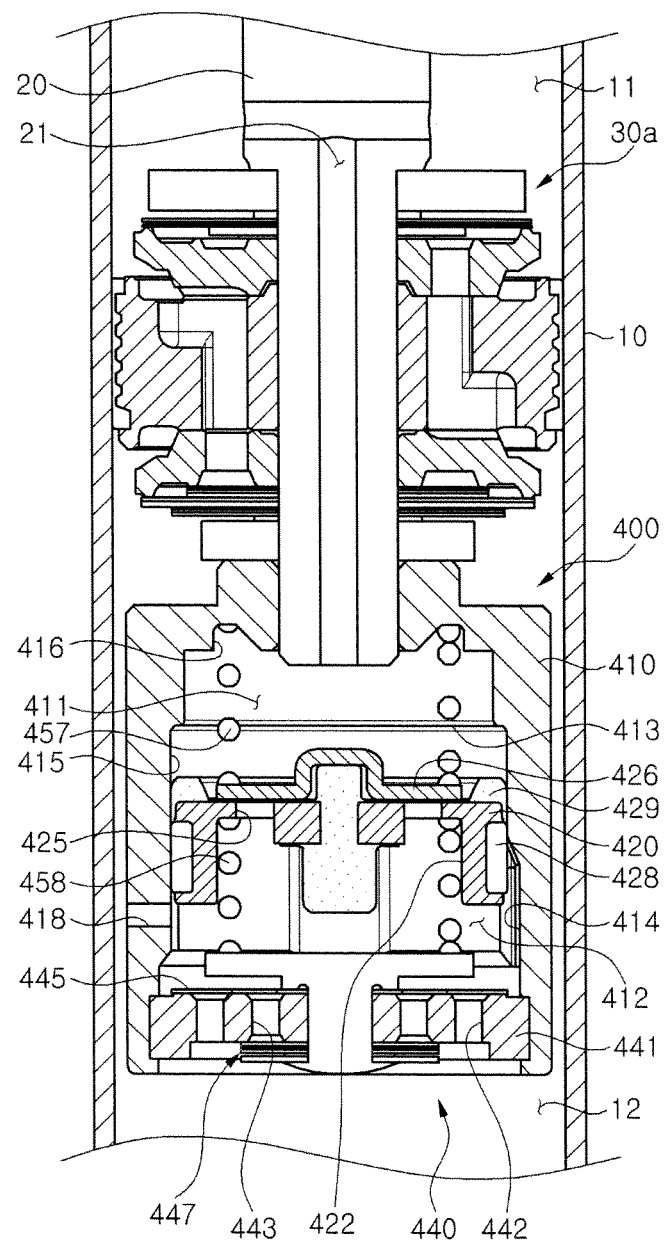
FIG. 10 is a cross-sectional view showing a valve structure of a shock absorber according to a fourth embodiment of the present invention.

Although the main piston valve assembly 30a of FIG. 10 is shown as having a different configuration from the main piston valve assembly 30 of FIG. 1, the configurations of the main piston valve assemblies 30 and 30a are merely exemplary and the present invention is not limited by the configurations of the main piston valve assemblies.

The auxiliary valve assembly 440 includes an auxiliary valve body 441, an auxiliary compression valve unit 445, and an auxiliary rebound valve unit 447. The auxiliary valve body 441 has at least one auxiliary compression passage 442, through which a working fluid passes during compression of the shock absorber, and at least one auxiliary rebound passage 443, through which a working fluid passes during rebound of the shock absorber. The auxiliary compression valve unit 445 is disposed above the auxiliary valve body 441 to generate a damping force against a pressure of the working fluid passing through the auxiliary compression passage 442. The auxiliary rebound valve unit 447 is disposed under the auxiliary valve body 441 to generate a damping force against a pressure of the working fluid passing through the auxiliary rebound passage 443. A fixing member 444, including a rivet, a bolt, and a nut, is installed in the middle of the auxiliary valve body 441, such that the auxiliary compression valve unit 445 and the auxiliary rebound valve unit 447 are disposed above and under the auxiliary valve body 441.

Although the auxiliary valve assembly 440 of FIG. 10 is shown as having a different configuration from the auxiliary valve assembly 140 of FIG. 1, the configurations of the auxiliary valve assemblies 140 and 440 are merely exemplary.

The auxiliary valve body 441 of the auxiliary valve assembly 440 is fixed under the main piston valve assembly 30a by the housing 410. An inner space of the housing 410, in particular, an upper space 411 above the free piston 420, may communicate with an upper chamber 11 through a connection passage 21 formed inside the piston rod 20. An inner space of the housing 410, in particular, a lower space 412 under the free piston 420, may directly communicate with a lower chamber 12 through the auxiliary valve assembly 440 or a communication hole 418. The inner space of the housing 410 may be partitioned into the upper space 411 and the lower space 412 by the free piston 420.

The communication hole 418 may be formed in a lower sidewall of the housing 410 to directly communicate the lower space 412 of the housing 410 with the lower chamber 12.

The free piston 420 is installed to move vertically within the inner space of the housing 410 according to a frequency (amplitude). The free piston 420 is supported within the inner space of the housing 410 by an upper spring 457 as an upper elastic member and a lower spring 458 as a lower elastic member. The upper elastic member and the lower elastic member may be any one selected from a spring, a disk, and a clip. The upper elastic member and the lower elastic member may be any member that can support the free piston 420 by elasticity. The upper spring 457 and the lower spring 458 as the elastic members may be different in shape or modulus of elasticity, and various modifications may be made in design.

According to the embodiments illustrated in FIGS. 10 to 12B, it can be seen that cylinder-type coil springs are employed as the upper spring 457 and the lower spring 458, but this is merely exemplary. As examples of the upper spring 457 and the lower spring 458, cone-type coil springs may be employed.

In order for centering, that is, in order for the upper spring 457 and the lower spring 458 to maintain normal positions within the housing 410, mount portions, on which the upper or lower ends of the upper spring 457 and the lower spring 458 are mounted, may be formed within the housing 410.

For example, a circular recess portion 416, into which the upper portion of the upper spring 457 is inserted, may be formed on an inner upper surface of the housing 410, such that the upper spring 457 is located at the normal position within the housing 410. According to the present embodiment, since the upper portion of the upper spring 457 is inserted into the recess portion 416 as the mount portion, the upper spring 457 can be maintained at the normal position even when the compression and expansion of the upper spring 457 are repeated by the vertical movement of the free piston 420 during operations of the shock absorber.

For example, a concave portion 422, into which the upper end of the lower spring 458 is inserted, may be formed on a bottom surface of the free piston 420, such that the lower spring 458 is located at the normal position within the housing 410. An internal diameter of the concave portion 422 as a mount portion formed on a bottom surface of the free piston 420 may be substantially equal to an external diameter of the lower spring 458. According to the present embodiment, since the upper portion of the lower spring 458 is inserted into the concave portion 422 of the free piston 420, the lower spring 458 can be maintained at the normal position even when the compression and expansion of the lower spring 458 are repeated by the vertical movement of the free piston 420 during operations of the shock absorber.

The recess portion 416 and the concave portion 422 are disclosed as the mount portions on which the upper portion of the upper spring 457 or the lower spring 458 can be mounted, but the present embodiment can be modified to include mount portions on which the lower portion of the upper spring 457 and the lower spring 458 can be mounted.

The free piston 420 has a through-hole 425 that is opened during a low-frequency compression to allow a working fluid to flow from the lower space 412 to the upper space 411. If no external force is applied, the through-hole 425 maintains a state closed by a valve body 426. The valve body 426 is stacked on the upper surface of the free piston 420. The lower end of the upper spring 457 is mounted on the valve body 426. Accordingly, the valve body 426 is pressurized toward the free piston 420. The concave portion 422 may be formed on the bottom surface of the free piston 420 as a mount portion on which the upper end of the lower spring 458 can be mounted. The lower end of the lower spring 458 is mounted on the fixing member 444 of the auxiliary valve assembly 440.

As in the case of the first and second embodiments, a Teflon band 428 may be attached to the outer circumferential surface of the free piston 420. A lip portion 429 made of a rubber may be attached to an outer circumferential surface of the upper surface of the free piston 420. During low-frequency compression, the lip portion 429 can closely contact the inner surface of the housing 410 (that is, a stepped portion 413 to be described below) and perform a sealing function.

According to the fourth embodiment, instead of inserting a separate inner tube into the housing 410, a stepped portion 413 and a groove portion 414 may be directly formed on the inner surface of the housing 410 when needed. Accordingly, as the free piston 420 moves vertically within the housing 410, the passage communicating the upper chamber 11 with the lower chamber 12 within the cylinder 10 may be opened or closed.

According to the fourth embodiment, the stepped portion 413 limiting the movement of the free piston 420 is formed on the inner surface of the upper space 411 of the housing 410. A plurality of groove portions 414 are formed on the inner surface of the lower space 412 of the housing 410. An intermediate portion 415 is formed between the stepped portion 413 and the groove portion 414 on the inner surface of the housing 410. The intermediate portion 415 has an internal diameter substantially equal to an external diameter of the free piston 420, more specifically, an external diameter of the band 428 provided at an outer circumferential edge of the free piston 420. When no external force is applied, the free piston 420 is disposed at the intermediate portion 415 of the housing 410.

When no external force is applied, the free piston 420 does not allow the flow of the working fluid between the upper chamber 11 and the lower chamber 12. On the other hand, when the external force is applied to move the free piston 420 downward by more than a predetermined distance and thus the free piston 420 gets out of the intermediate portion 415, the working fluid may flow through the groove portion 414. In addition, when the external force is applied to move upward the valve body 426 stacked on the upper surface of the free piston 420 while compressing the upper spring 457, the through-hole 425 is opened to allow the flow of the working fluid.

According to the fourth embodiment of the present invention, when the passage between the upper space 411 and the lower space 412 is opened, the working fluid pressurizing the free piston 420 flows through this passage. In other words, according to the fourth embodiment of the present invention, since the working fluid pressurizing the free piston 420 flows through the passage to an opposite side of the free piston 420, the flow of the working fluid pressurizing the free piston 420 and the flow of the working fluid passing through the free piston 420 and flowing to the opposite side of the free piston 420 are formed as a single flow, not separate flows.

FIG. 10 shows a position of the free piston 420 in an initial state in which no external force is applied. When the external force, such as the inertia and the pressure of the working fluid, is applied, the free piston 420 may move while compressing the upper spring 457 or the lower spring 458. That is, when the external force applied to the free piston 420 is strong enough to compress the upper spring 457 or the lower spring 458, the free piston 420 moves upward or downward.

Figure 11A:
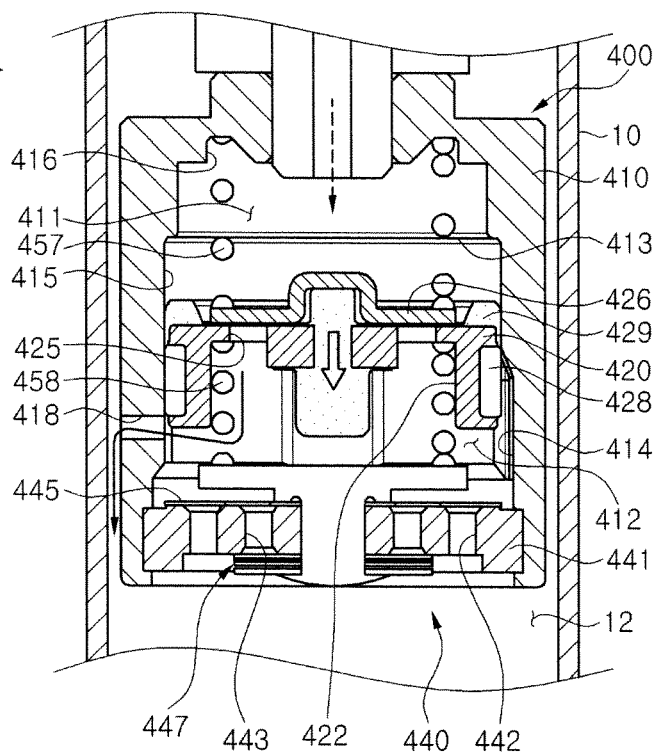
FIG. 11A is a cross-sectional view showing main parts for describing a fluid flow through a valve structure of a shock absorber in a high-frequency rebound mode according to a fourth embodiment of the present invention.
Figure 11B:
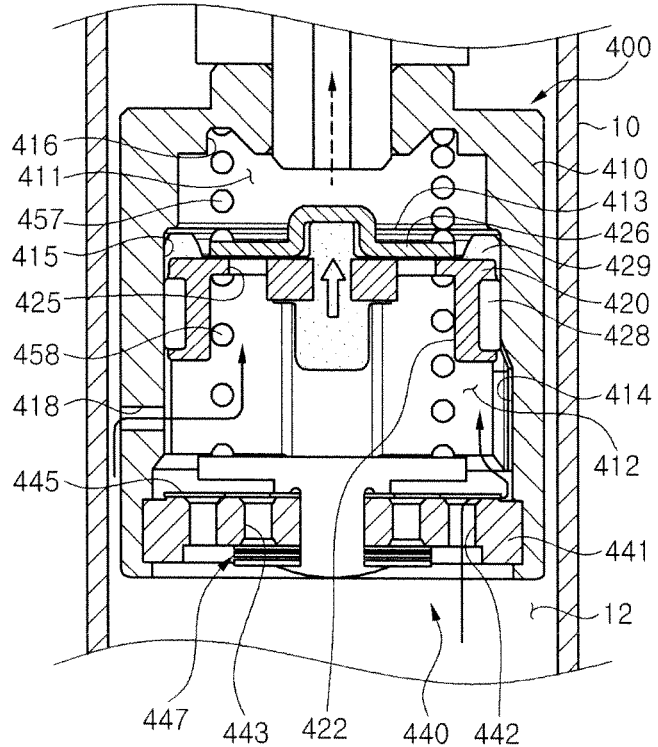
FIG. 11B is a cross-sectional view showing main parts for describing a fluid flow through a valve structure of a shock absorber in a high-frequency compression mode according to a fourth embodiment of the present invention.
Figure 12A:
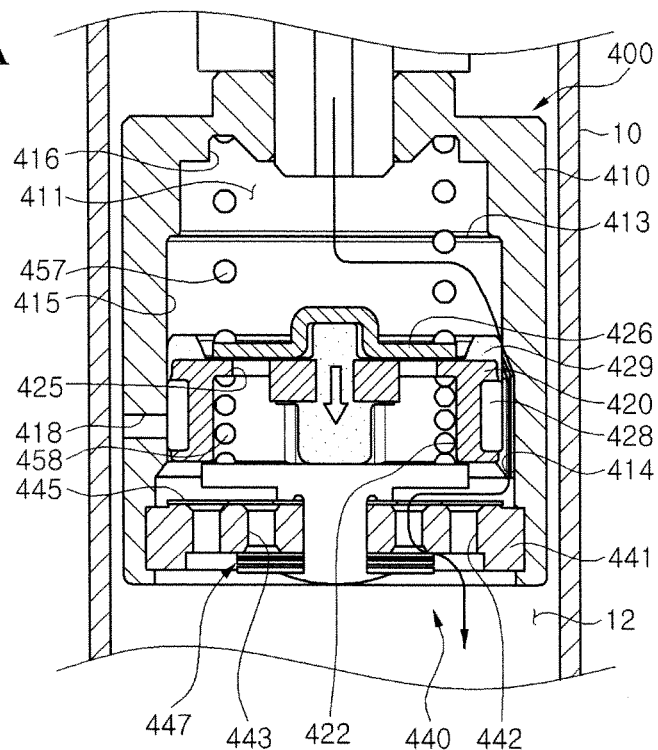
FIG. 12A is a cross-sectional view showing main parts for describing a fluid flow through a valve structure of a shock absorber in a low-frequency rebound mode according to a fourth embodiment of the present invention.
Figure 12B:
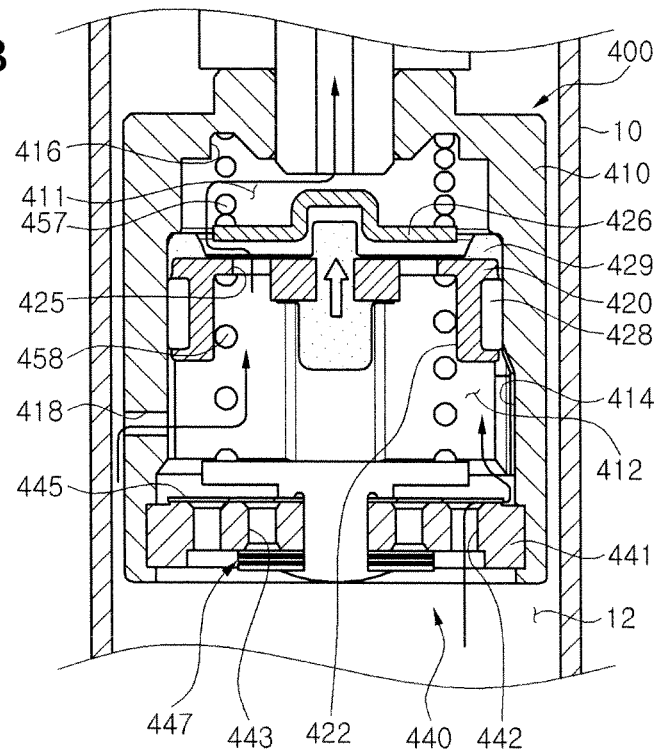
FIG. 12B is a cross-sectional view showing main parts for describing a fluid flow through a valve structure of a shock absorber in a low-frequency compression mode according to a fourth embodiment of the present invention.

FIG. 11A shows a position of the free piston 420 during a high-frequency (that is, small-amplitude) rebound, and FIG. 11B shows a position of the free piston 420 during a high-frequency (that is, small-amplitude) compression. FIG. 12A shows a position of the free piston 420 during a low-frequency (that is, large-amplitude) rebound, and FIG. 12B shows a position of the free piston 420 during a low-frequency (that is, large-amplitude) compression.

Hereinafter, the operation of the valve structure according to the fourth embodiment when a high-frequency vibration is input from a road surface will be described with reference to FIGS. 11A and 11B.

FIGS. 11A and 11B show states in which the free piston 420 does not compress the upper spring 457 or the lower spring 458 sufficiently enough to escape from the intermediate portion 415 of the housing 410 because the movement amplitude of the piston rod of the shock absorber is small and the frequency thereof is high. Even though the free piston 420 moves vertically, in a state that the free piston 420 does not escape from the intermediate portion 415, the outer surface of the free piston 420 is in contact with the intermediate portion 415 of the inner surface of the housing 410. Therefore, the flow of the working fluid between the upper space 411 and the lower space 412 is impossible. That is, it is impossible to allow the working fluid to flow through the opened through-hole 425 or to allow the working fluid to flow through the groove portion 414.

The upper space 411 of the housing 410 communicates with the upper chamber 11 through the connection passage 21 formed inside the piston rod 20, and the lower space 412 of the housing 410 communicates with the lower chamber 12 through the communication hole 418 formed in the housing 410.

As illustrated in FIG. 11A, during the high-frequency rebound of the piston rod, the free piston 420 moves downward within the housing 410. Accordingly, the volume of the upper space 411 is slightly increased and the volume of the lower space 412 is slightly decreased. The working fluid within the upper chamber 11, which corresponds to the increased volume of the upper space 411, flows to the upper space 411 through the connection passage 21. The working fluid within the lower space 412, which corresponds to the decreased volume of the lower space 412, flows to the lower chamber 12 through the communication hole 418.

According to the present embodiment, since the communication hole 418 is formed in the housing 410, the working fluid within the lower space 412 may flow to the lower chamber 12, without passing through the auxiliary valve assembly 440.

As illustrated in FIG. 11B, during the high-frequency compression of the piston rod, the free piston 420 moves upward within the housing 410. Accordingly, the volume of the upper space 411 is slightly decreased and the volume of the lower space 412 is slightly increased. The working fluid within the upper space 411, which corresponds to the decreased volume of the upper space 411, flows to the upper chamber 11 through the connection passage 21. The working fluid within the lower chamber 12, which corresponds to the increased volume of the lower space 412, flows to the lower space 412 through the communication hole 418.

According to the present embodiment, since the communication hole 418 is formed in the housing 410, the working fluid within the lower chamber 12 may flow to the lower space 412, without passing through the auxiliary valve assembly 440.

It is obvious that the flow of the working fluid through the auxiliary valve assembly 410 is also possible as shown on the right side of FIG. 11B, as long as the pressure of the working fluid is strong enough to open the auxiliary compression valve unit 445 of the auxiliary valve assembly 440.

Hereinafter, the operation of the valve structure according to the fourth embodiment when a low-frequency vibration is input from a road surface will be described with reference to FIGS. 12A and 12B.

FIGS. 12A and 12B show states in which the free piston 420 compresses the upper spring 457 or the lower spring 458 sufficiently enough to escape from the intermediate portion 415 of the housing 410 because the movement amplitude of the piston rod of the shock absorber is large and the frequency thereof is small. As the free piston 420 moves vertically, the flow of the working fluid is possible between the upper space 411 and the lower space 412. That is, it is possible to allow the working fluid to flow through the opened through-hole 425 or to allow the working fluid to flow through the groove portion 414.

The upper space 411 of the housing 410 communicates with the upper chamber 11 through the connection passage 21 formed inside the piston rod 20, and the lower space 412 of the housing 410 communicates with the lower chamber 12 through the communication hole 418 formed in the housing 410.

As illustrated in FIG. 12A, during the low-frequency rebound of the piston rod, the free piston 420 moves downward within the housing 410. Accordingly, the communication hole 418 is closed, and simultaneously, the groove portion 414 is opened. When the communication hole 418 is closed, the working fluid within the lower space 412 generates a damping force while passing through the auxiliary valve assembly 440 and then flows to the lower chamber 12. At this time, the working fluid within the upper chamber 11 flows to the upper space 411 through the connection passage 21, flows to the lower space 412 through the opened groove portion 414, and then flows to the lower chamber 12 through the auxiliary valve assembly 440.

In addition, as illustrated in FIG. 12B, during the low-frequency compression of the piston rod, the free piston 420 moves upward within the housing 410 and comes into contact with the stepped portion 413. Since an external force is continuously applied, the upper spring 457 is further compressed. Accordingly, the valve body 426 moves upward and the through-hole 425 is opened. At this time, when the through-hole 425 is opened, the working fluid within the lower chamber 12 flows to the lower space 412 through the communication hole 418 and the auxiliary valve assembly 440, flows to the upper space 411 through the through-hole 425 of the free piston 420, and then flows to the upper chamber 11 through the connection passage 21 provided in the piston rod 20.

Figure 13A:
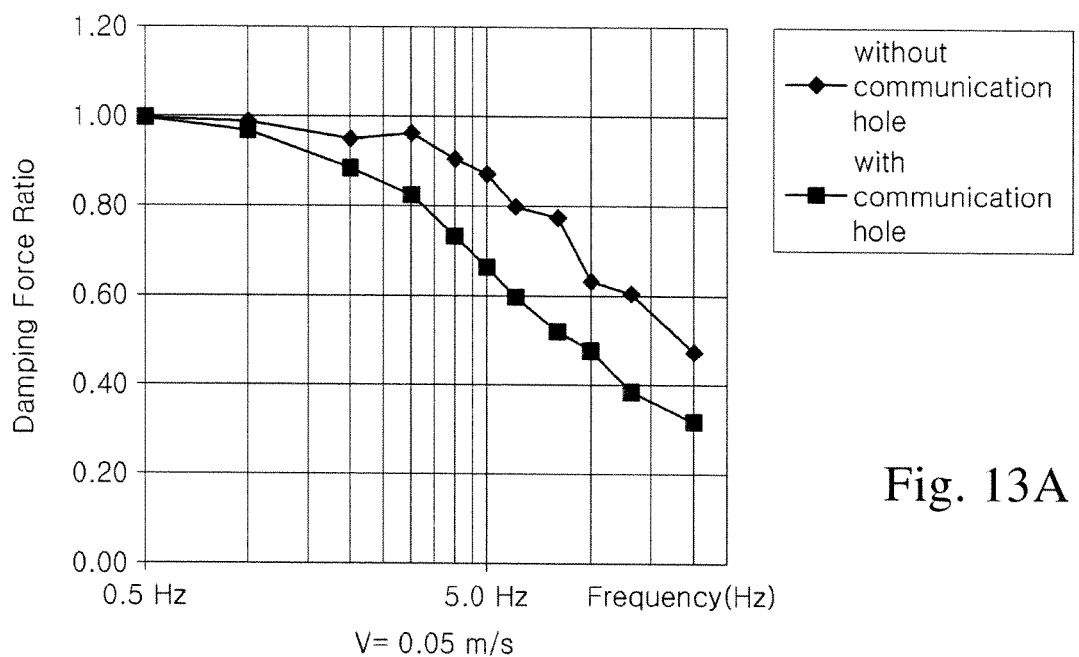
FIGS. 13A and 13B are graphs showing a change in a damping force ratio when comparing a case where a communication hole is formed in a housing with a case where no communication hole is formed in a housing.
Figure 13B:
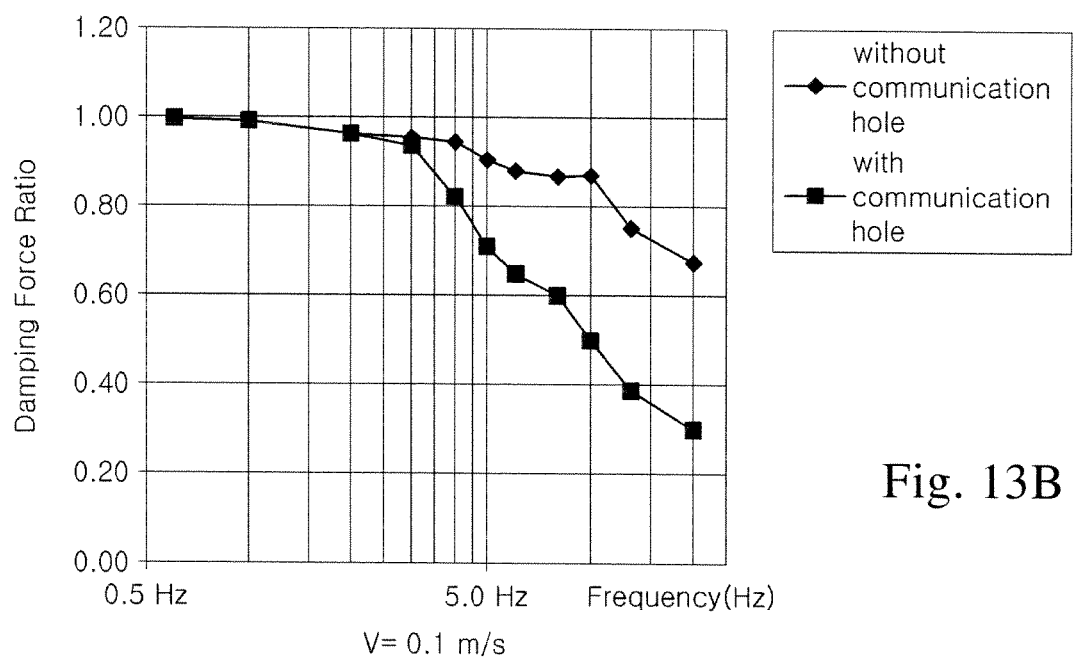

FIGS. 13A and 13B are graphs showing a change in a damping force ratio when comparing a case where the communication hole 418 is formed in the housing with a case where no communication hole 418 is formed in the housing. FIG. 13A shows a graph of a change in a damping force ratio according to a frequency when a moving speed of the piston rod is 0.05 m/s, and FIG. 13B shows a graph of a change in a damping force ratio according to a frequency when a moving speed of the piston rod is 0.1 m/s.

In the case where the communication hole 418 is formed, since an additional passage is formed by the communication hole 418, a high-frequency damping force is reduced and frequency-sensitive performance is improved by about 20 to 40% at 5 to 10 Hz, as compared to the case where no communication hole 418 is formed. Consequently, in a case where the communication hole 418 is formed, it is possible to reduce the high-frequency damping force when the high-frequency vibration is input from the road surface (for example, during expressway driving.

Therefore, the valve structure of the shock absorber according to the present invention can satisfy both the vehicle ride comfort and the steering stability.

While the valve structure of the shock absorber according to the present invention has been described with reference to the specific embodiments, it will be apparent to those skilled in the art that various changes and modifications may be made without departing from the spirit and scope of the invention as defined in the following claims.

What is claimed is:

1. A valve structure of a shock absorber including a cylinder filled with a working fluid and a piston rod having one end located inside the cylinder and the other end extending outward from the cylinder, the valve structure comprising:
    a main piston valve assembly installed at one end of the piston rod and configured to operate in a state that the inside of the cylinder is divided into an upper chamber and a lower chamber, and generate a damping force varying according to a moving speed; and
    a frequency unit configured to move together with the main piston valve assembly and generate a damping force varying according to a frequency, wherein the frequency unit comprises:
    a hollow housing mounted at a lower end of the piston rod such that the housing is disposed under the main piston valve assembly;
    a free piston disposed to be vertically movable within the housing;
    an auxiliary valve assembly mounted at a lower end of the housing, and
    a communication hole formed in a lower sidewall of the housing to directly communicate an inner space of the housing with the lower chamber, such that the communication between the inner space of the housing and the lower chamber is blocked when the free piston moves downward,
    wherein the inner space of the housing is partitioned into an upper space and a lower space by the free piston, and the free piston has a through-hole that is opened during a low-frequency compression to allow the working fluid of to flow from the lower space to the upper space, and
    wherein the free piston includes a valve body that maintains the through-hole in a closed state when no external force is applied.

2. The valve structure according to claim 1, wherein a stepped portion is formed in an inner surface of the upper space of the housing.

3. The valve structure according to claim 2, wherein a groove portion is formed in an inner surface of the lower space of the housing.

4. The valve structure according to claim 3, wherein an intermediate portion having an internal diameter substantially equal to an external diameter of the free piston is formed between the stepped portion and the groove portion.

5. The valve structure according to claim 1, wherein a Teflon™ band is attached to an outer circumferential surface of the free piston, and a lip portion made of a rubber is attached to an outer circumferential surface of an upper surface of the free piston.

6. The valve structure according to claim 1, wherein the valve body is pressurized in a direction of closing the through-hole by an elastic member.

7. The valve structure according to claim 1, further comprising an elastic member that elastically supports the free piston within the inner space of the housing.

8. The valve structure according to claim 7, wherein the elastic member includes;
    an upper elastic member located on the free piston within the housing; and
    a lower elastic member located between the free piston and the auxiliary valve assembly.

9. The valve structure according to claim 7, wherein the elastic member is a coil spring.

10. The valve structure according to claim 8, wherein the housing includes a recess portion into which an upper end of the upper elastic member is inserted.

11. The valve structure according to claim 8, wherein the free piston includes a concave portion into which an upper end of the lower elastic member is inserted.

12. The valve structure according to claim 1, wherein the inner space of the housing communicates with the upper chamber through a connection passage formed inside the piston rod.

13. The valve structure according to claim 1, wherein the inner space of the housing communicates with the lower chamber through the communication hole and the auxiliary valve assembly.

* * * * *